(12) United States Patent
Song et al.

(10) Patent No.: US 12,453,950 B1
(45) Date of Patent: Oct. 28, 2025

(54) THERMOSTATIC BOXES FOR PREPARING HYDROGELS BY FREEZE-THAW PROCESSES AND PREPARATION METHODS THEREOF

(71) Applicant: BEIJING INSTITUTE OF TECHNOLOGY, Beijing (CN)

(72) Inventors: Weidong Song, Beijing (CN); Song Liu, Beijing (CN); Lijun Xiao, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

(21) Appl. No.: 19/192,589

(22) Filed: Apr. 29, 2025

(30) Foreign Application Priority Data

Apr. 30, 2024 (CN) .......................... 202410539818.4

(51) Int. Cl.
- *B01J 19/06* (2006.01)
- *B01J 14/00* (2006.01)
- *B01L 7/02* (2006.01)

(52) U.S. Cl.
CPC ............ *B01J 19/06* (2013.01); *B01J 14/005* (2013.01); *B01L 7/02* (2013.01); *B01J 2219/00123* (2013.01)

(58) Field of Classification Search
CPC . B01J 19/06; B01J 14/00; B01J 14/005; B01J 13/0065; B01J 13/0069; B01J 2219/00123; B01J 2219/00761; B01L 7/02; F25D 31/006
See application file for complete search history.

(56) References Cited

U.S. PATENT DOCUMENTS

| | | |
|---|---|---|
| 6,170,267 B1 | 1/2001 | Kitaoka |
| 2009/0173093 A1 | 7/2009 | Sueda et al. |
| 2023/0294100 A1 | 9/2023 | Nishikawa et al. |

FOREIGN PATENT DOCUMENTS

| | | |
|---|---|---|
| CN | 207694764 U | 8/2018 |
| CN | 210285224 U | 4/2020 |
| CN | 113776262 A | 12/2021 |
| CN | 215404253 U | 1/2022 |
| CN | 217473562 U | 9/2022 |

(Continued)

OTHER PUBLICATIONS

Notification to Grant Patent Right for Invention in Chinese Application No. 202410539818.4 mailed on Feb. 21, 2025, 6 pages.

(Continued)

*Primary Examiner* — Lessanework Seifu
(74) *Attorney, Agent, or Firm* — PORUS IP LLC (57) ABSTRACT

Disclosed is a thermostatic box for preparing a hydrogel by a freeze-thaw process and a preparation method thereof. The thermostatic box includes a box body. A top of the box body is provided with an upper cover plate. A front side of the box body is provided with a front cover plate. Air outlet holes are disposed in the upper cover plate. A storage chamber and a drainage chamber are disposed in box body. The storage chamber is located on an upper side of the drainage chamber. Porous storage platforms are disposed in the storage chamber. A side of the plurality of porous storage platforms is provided with a first blowing mechanism. An area of a right side of the drainage chamber and a lower side of the porous storage platforms is provided with a second blowing mechanism. A side of the drainage chamber is provided with a drainage hole.

8 Claims, 4 Drawing Sheets

(56) References Cited

FOREIGN PATENT DOCUMENTS

| | | |
|---|---|---|
| CN | 218349048 U | 1/2023 |
| CN | 117388696 A | 1/2024 |
| CN | 117839577 A | 4/2024 |
| JP | 2005098674 A | 4/2005 |
| JP | 2006030144 A | 2/2006 |

OTHER PUBLICATIONS

Yang, Mingtao et al., Preparation and Characterization of Gelatin-based Antibacterial Hydrogels, Journal of Yichun University, 44(12): 29-34, 2022.

M. J. Eagle et al., Investigating the warming and cooling rates of human cadavers by development of a gel-filled model to validate core temperature, Cell and Tissue Banking, 8: 297-302, 2007.

THERMOSTATIC BOXES FOR PREPARING HYDROGELS BY FREEZE-THAW PROCESSES AND PREPARATION METHODS THEREOF

CROSS-REFERENCE TO RELATED APPLICATIONS

This application claims priority to Chinese Patent Application No. 202410539818.4, filed on Apr. 30, 2024, the entire contents of which are incorporated herein by reference.

TECHNICAL FIELD

The present disclosure relates to the technical field of hydrogel preparation, and in particular, to a thermostatic box for preparing a hydrogel by a freeze-thaw process and a preparation method thereof.

BACKGROUND

A gel refers to a dispersion system in which swollen polymer molecules interconnect to form a three-dimensional network structure, with voids of the network filled with a liquid medium. A polymer hydrogel (also referred to as a hydrogel) is an important material in the field of fundamental research technology. The hydrogel is a water-insoluble polymer with a network structure that contains a large amount of water, exhibiting excellent softness, elasticity, liquid retention capacity, and biocompatibility, thereby making it widely applicable in biomedical and bioengineering fields. A typical example is a polyvinyl alcohol (PVA) hydrogel prepared by the freeze-thaw process. This process involves subjecting a PVA solution to a specific low temperature for a time period, and then placing at a room temperature for a time period to achieve a hydrogel with desired mechanical properties.

Common low-temperature equipment usually includes refrigerators and cryogenic freezers. However, such devices generally rely on compressors for refrigeration, and due to the large internal chamber, the temperature distribution inside tends to be non-uniform, which may easily lead to significant differences in the mechanical properties of hydrogels prepared by the freeze-thaw process within the same batch.

SUMMARY

One of the embodiments of the present disclosure provides a thermostatic box for preparing a hydrogel by a freeze-thaw process. The thermostatic box may comprise a box body. A top of the box body may be provided with an upper cover plate, and a front side of the box body may be provided with a front cover plate. A plurality of uniformly distributed air outlet holes may be disposed in the upper cover plate. A storage chamber and a drainage chamber may be disposed in the box body. The storage chamber may be located on an upper side of the drainage chamber. A plurality of porous storage platforms arranged in parallel may be disposed in the storage chamber. A side of the plurality of porous storage platforms may be provided with a first blowing mechanism. An area located on a right side of the drainage chamber and a lower side of the plurality of porous storage platforms may be provided with a second blowing mechanism. A side of the drainage chamber may be provided with a drainage hole.

One of the embodiments of the present disclosure provides a preparation method of a thermostatic box for preparing a hydrogel by a freeze-thaw process. The preparation method may be applied to the thermostatic box for preparing the hydrogel by the freeze-thaw process described above. The preparation method may comprise: S1, establishing a component model of a box body using SOLIDWORKS, adjusting dimensions of a plurality of components and dimensions and positions of holes, and assembling the plurality of components into a box body model; S2, cutting acrylic plates based on the dimensions of the plurality of components; S3, fixedly connecting a first blowing mechanism and a second blowing mechanism to corresponding acrylic plates by bolts; and S4, bonding the plurality of components completely using a bonding agent based on the box body model.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein.

REFERENCE SIGNS 1, box body; 2, upper cover plate; 3, front cover plate; 4, air outlet hole; 5, storage chamber; 6, drainage chamber; 7, porous storage platform; 8, drainage hole; 9, first support block; 10, fan support bracket; 11, first blowing mechanism; 12, first ventilation chamber; 13, first support rod; 14, drainage plate; 15, support plate; 16, second support block; 17, second blowing mechanism; 18, fixing pin; 19, second ventilation chamber.

DETAILED DESCRIPTION

The accompanying drawings, which are required to be used in the description of the embodiments, are briefly described below. The accompanying drawings do not represent the entirety of the embodiments.

Unless the context clearly suggests an exception, the words "one," "a," "an," "one kind," and/or "the" do not refer specifically to the singular, but may also include the plural. Generally, the terms "including" and "comprising" suggest only the inclusion of clearly identified steps and elements, however, the steps and elements that do not constitute an exclusive list, and the method or apparatus may also include other steps or elements.

It should be understood that, for the purpose of describing the present disclosure, the terms "center," "upper surface,"

"lower surface," "up," "down," "top," "bottom," "inner," "outer," "axial," "radial," "peripheral," "external," or the like, indicate positional relationships based on those shown in the accompanying drawings, rather than indicating that the device, assembly, or unit referred to must have a particular positional relationship, and are not to be construed as a limitation of the present disclosure. However, the terms may be replaced by other expressions if other words accomplish the same purpose.

Example 1

Figure 1:
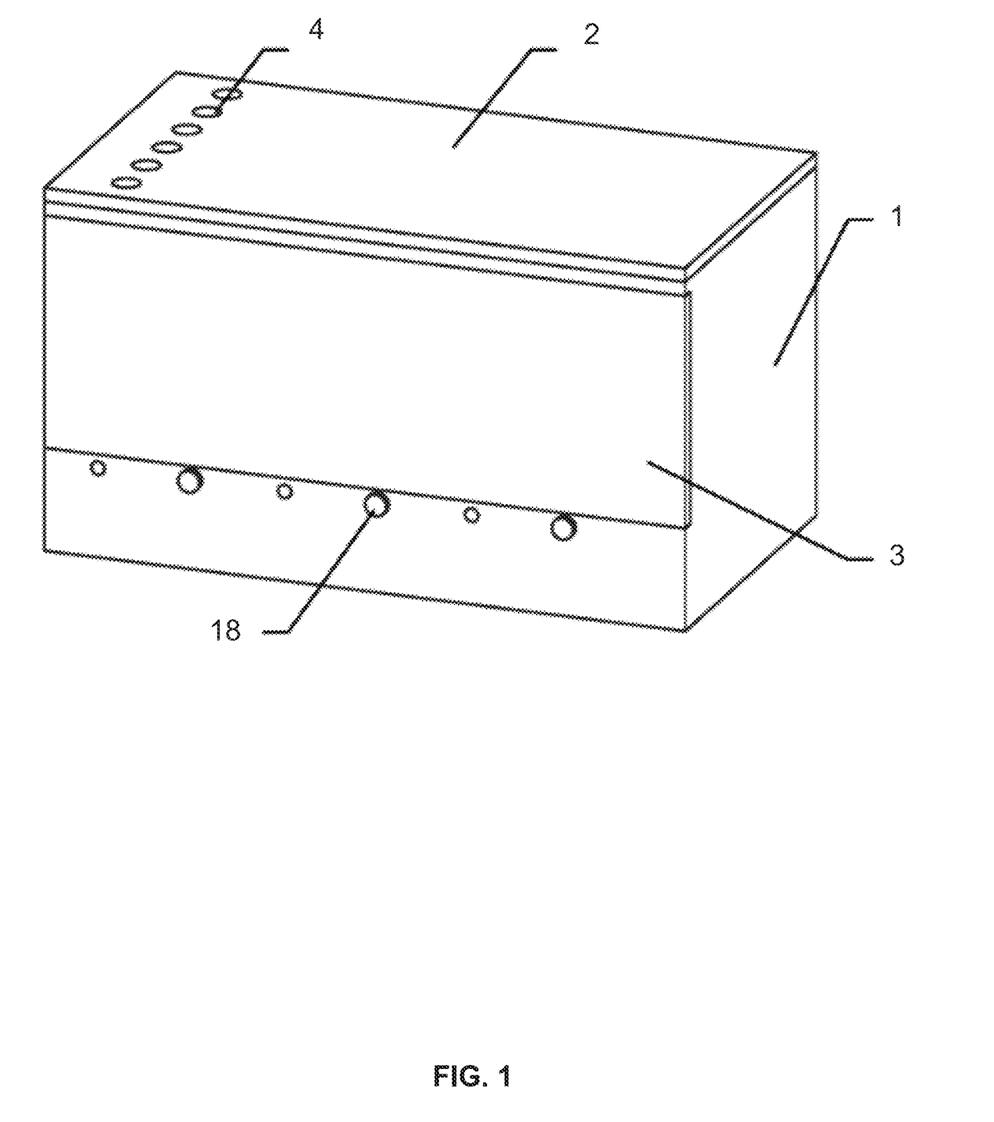
FIG. 1 is a schematic diagram illustrating a thermostatic box for preparing a hydrogel by a freeze-thaw process according to some embodiments of the present disclosure.

FIG. 1 is a schematic diagram illustrating a thermostatic box for preparing a hydrogel by a freeze-thaw process according to some embodiments of the present disclosure.

In some embodiments, the present disclosure provides a thermostatic box for preparing a hydrogel by a freeze-thaw process. The thermostatic box includes a box body. A top of the box body is provided with an upper cover plate, and a front side of the box body is provided with a front cover plate. A plurality of uniformly distributed air outlet holes are disposed in the upper cover plate. A storage chamber and a drainage chamber are disposed in the box body. The storage chamber is located on an upper side of the drainage chamber. A plurality of porous storage platforms arranged in parallel are disposed in the storage chamber. A side of the plurality of porous storage platforms is provided with a first blowing mechanism. An area located on a right side of the drainage chamber and a lower side of the plurality of porous storage platforms is provided with a second blowing mechanism. A side of the drainage chamber is provided with a drainage hole.

As shown in FIG. 1, the present disclosure provides the thermostatic box for preparing the hydrogel by the freeze-thaw process, including a box body 1.

The box body 1 is a main structural part of the thermostatic box, responsible for providing support, protection, and other functions. In some embodiments, the box body 1 may be made from a plurality of materials by a plurality of processes. The materials for manufacturing the box body 1 include, but are not limited to, a polycarbonate (PC) plate, a polystyrene (PS) plate, an acrylic plate, or the like; and the processes for manufacturing the box body 1 include, but are not limited to, thermoforming, molding, laminating, or the like.

In some embodiments, a main body of the box body 1 is made of the acrylic plates by splicing, and adjacent acrylic plates of the acrylic plates are connected by a bonding agent.

The splicing of the acrylic plates may be realized in various ways, such as glued connection, mechanical connection, thermal fusion connection, mortise and tenon connection, or the like.

In some embodiments, the bonding agent used is an acrylic-specific bonding agent. The acrylic-specific bonding agent includes a solvent-based acrylic adhesive, a modified acrylate adhesive, an ultraviolet (UV) curing acrylic adhesive, or the like.

In some embodiments of the present disclosure, the box body 1 is made of the acrylic plates, which is easy to install, and the overall structure is lightweight, making it convenient for movement or transportation.

In some embodiments, as shown in FIG. 1, the top of the box body is provided with an upper cover plate 2, the front side of the box body is provided with a front cover plate 3, and the front cover plate 3 and the box body 1 are detachably connected to facilitate placing samples inside the box body 1 after opening the front cover plate 3.

The detachable connection between the front cover plate 3 and the box body 1 may be realized in various ways, including but not limited to threaded connection, snap connection, plug connection, or the like. The samples include a precursor solution of a hydrogel, a gel material that is preliminarily molded, or the like.

In some embodiments, a plurality of uniformly distributed air outlet holes 4 are disposed in the upper cover plate 2, facilitating air circulation inside the box body 1. For example, a column of six uniformly distributed air outlet holes 4 are disposed on a left side of the upper cover plate 2, as shown in FIG. 1. It is understood that a count and positions of the air outlet holes may be set according to actual needs.

Figure 3:
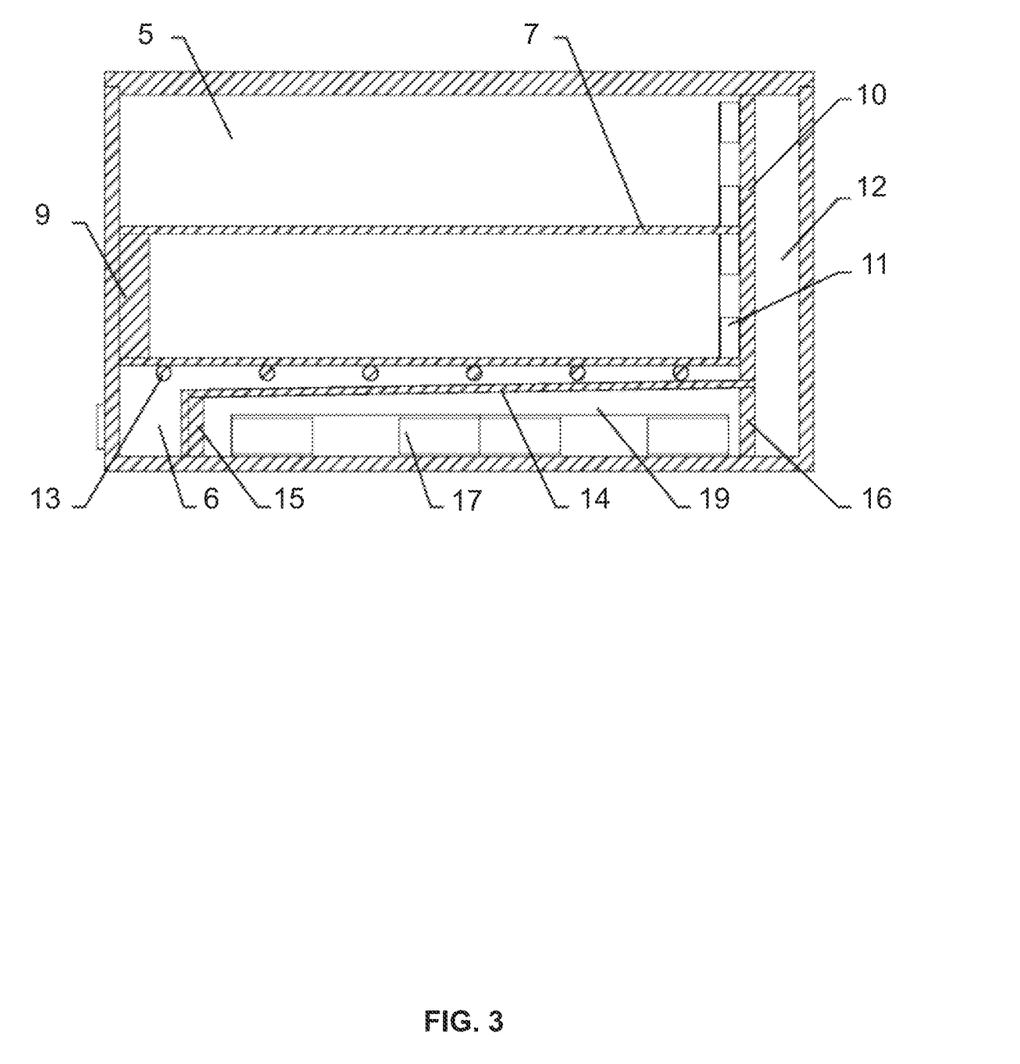
FIG. 3 is a cross-sectional view illustrating a thermostatic box for preparing a hydrogel by a freeze-thaw process according to some embodiments of the present disclosure.

FIG. 3 is a cross-sectional view illustrating a thermostatic box for preparing a hydrogel by a freeze-thaw process according to some embodiments of the present disclosure.

In some embodiments, as shown in FIG. 3, a storage chamber 5 and a drainage chamber 6 are disposed in the box body 1, and the storage chamber 5 is located on an upper side of the drainage chamber 6. The porous storage platforms may be disposed in the storage chamber 5 for placing the samples. In some embodiments, the plurality of porous storage platforms 7 arranged in parallel are disposed in storage chamber 5. For example, as shown in FIG. 3, two porous storage platforms arranged in parallel are disposed in the storage chamber 5. It is understood that a count of the porous storage platforms 7 may be set according to actual needs.

Figure 4:
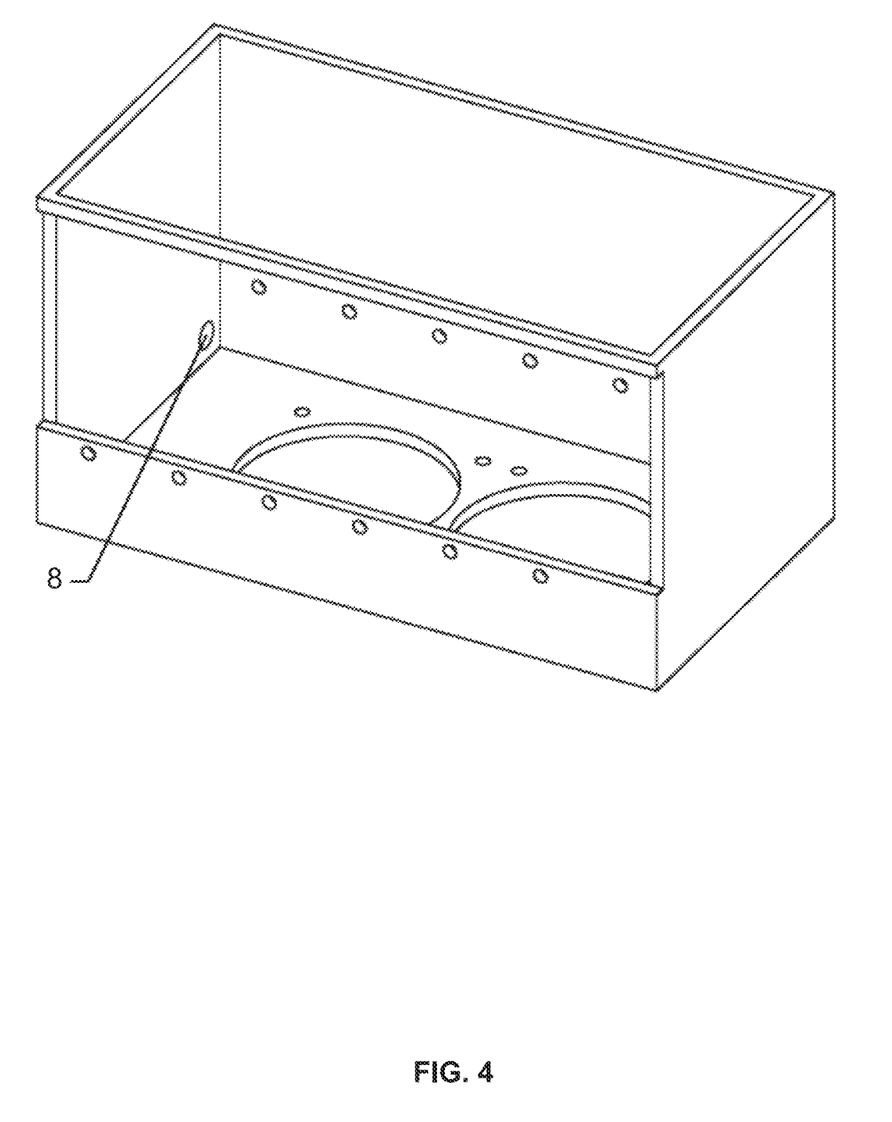
FIG. 4 is a schematic diagram illustrating a drainage hole in a thermostatic box for preparing a hydrogel by a freeze-thaw process according to some embodiments of the present disclosure.

FIG. 4 is a schematic diagram illustrating a drainage hole in a thermostatic box for preparing a hydrogel by a freeze-thaw process according to some embodiments of the present disclosure.

In some embodiments, a side of the drainage chamber 6 is provided with the drainage hole. A piston is detachably connected to the drainage hole. For example, as shown in FIG. 4, a left side of the drainage chamber 6 is provided with a drainage hole 8. A count and a position of the drainage hole 8 may be set according to actual needs. The piston refers to a component for controlling opening and closing of the drainage hole, corresponding one-to-one to the drainage hole 8. During normal operation of the thermostatic box, the piston blocks the drainage hole so that the drainage hole is closed. When condensate water needs to be discharged, the piston is pulled out of the drainage hole to make the drainage hole in an open state; after the drainage is completed, the piston is pushed back to make the drainage hole in a closed state gain. The detachable connection between the drainage hole 8 and the piston may be realized in various ways, including but not limited to threaded connection, snap connection, pin connection, flange connection, or the like.

The porous storage platforms 7 are used for placing the samples. The porous setting of the porous storage platforms 7 facilitate air circulation in the storage chamber 5. The drainage chamber 6 is provided to facilitate the collection of the condensate water inside the thermostatic box to be uniformly discharged outward. The condensate water is formed when water vapor in the air inside the thermostatic box condenses into liquid water after the water vapor encounters a low-temperature surface and the temperature drops below a dew point.

Figure 2:
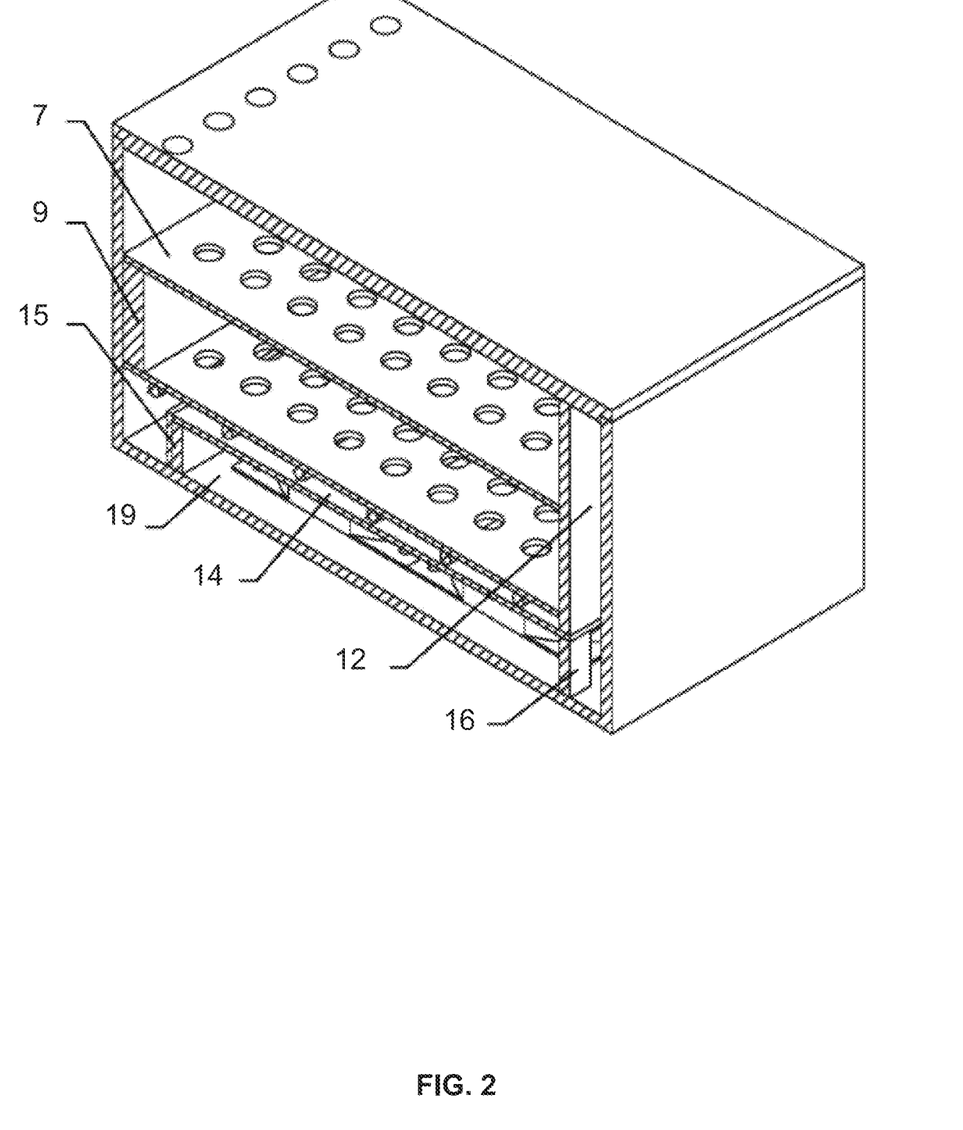
FIG. 2 is a schematic diagram illustrating an internal structure of a thermostatic box for preparing a hydrogel by a freeze-thaw process according to some embodiments of the present disclosure.

FIG. 2 is a schematic illustrating an internal structure of a thermostatic box for preparing a hydrogel by a freeze-thaw process according to some embodiments of the present disclosure.

In some embodiments, as shown in FIG. 2 and FIG. 3, a side of one of two adjacent porous storage platforms 7 and a side of the other of the two adjacent porous storage platforms 7 are connected by a first support block 9, and another side of one of the two adjacent porous storage platforms and another side of the other of the two adjacent porous storage platforms are connected by a fan support bracket 10, the first blowing mechanism 11 being disposed in the fan support bracket 10.

In some embodiments, the plurality of porous storage platforms 7 are disposed in the storage chamber 5, and correspondingly, a plurality of first support blocks 9 are disposed the storage chamber 5 for supporting every two adjacent porous storage platforms 7. For example, as shown in FIG. 3, one first support block 9 is disposed the storage chamber 5 for supporting two porous storage platforms 7.

In some embodiments, the fan support bracket 10 may be an integral structure or a separate structure. When the fan support bracket 10 is of the integral structure, a plurality of mounting positions may be preset on the fan support bracket 10 for securing a plurality of first blowing mechanisms 11. When the fan support bracket 10 is of the separate structure, a count of the fan support brackets 10 is equal to a count of the first blowing mechanisms 11.

The first blowing mechanism 11 refers to a component that introduces outside air into the thermostatic box. For example, the first blowing mechanism 11 is a fan provided with a power control device system. The power control device system refers to an electronic or electrical system for controlling a power supply of the fan, which is mainly configured to regulate a power input to the fan, thereby realizing control of starting, stopping, speed regulation, or other functions of the fan. A plurality of first blowing mechanisms 11 may be provided. A count of the first blowing mechanisms may be set according to actual needs.

The first blowing mechanism 11 blow the air in a first ventilation chamber 12 into a space above the porous storage platforms 7, which ensures the stability of the porous storage platforms 7 while facilitating the air circulation in the storage chamber 5, thereby ensuring that the temperature balance within the area where the porous storage platforms 7 are located.

More details regarding the first ventilation chamber 12 may be found in the present disclosure below.

A support structure may be provided at the top of the drainage chamber for supporting the porous storage platforms 7.

In some embodiments, as shown in FIG. 1 and FIG. 3, the top of the drainage chamber 6 is provided with a plurality of first support rods 13 for supporting the plurality of porous storage platforms 7, and two ends of each of the plurality of first support rods 13 are respectively connected with a front side wall and a rear side wall of the box body 1 by fixing pins 18.

For example, as shown in FIG. 3, the top of the drainage chamber 6 is provided with six first support rods 13; correspondingly, as shown in FIG. 1, twelve fixing pins 18 are provided to fix the first support rods 13 on the front side wall and the rear side wall of the box body, respectively. The count of the first support rods 13 and the fixing pins 18 may be set according to actual needs.

The fixing pins refer to parts for connecting or securing the first support rods to the box body. A plurality types of fixing pins may be provided, including but not limited to round pins, tapered pins, cotter pins, or the like.

In some embodiments, the plurality of first support rods 13 are disposed in parallel in a front-back direction, as shown in FIG. 3. The front-back direction refers to a direction formed by connecting the front side wall and the rear side wall of the box body 1. The first support rods 13 being respectively connected with the front side wall and the rear side wall of the box body 1 by the fixing pins 18 means that connection holes are provided on the front side wall and the rear side wall of the box body 1 for cooperating with the fixing pins to realize the connection. As shown in FIG. 4, holes corresponding to the front side wall and the rear side wall of the box body 1 are the connection holes.

The first support rods 13 are provided on a lower side of a bottommost porous storage platform 7 to provide support for the porous storage platform 7, thereby further improving the stability of the porous storage platform 7.

In some embodiments, the drainage chamber 6 is provided with an inclined drainage plate 14 located on a lower side of the storage chamber 5, a lower end of the drainage plate 14 is connected to a bottom plate of the box body 1 by a support plate 15, a higher end of the drainage plate 14 is connected to the bottom plate of the box body 1 by a second support block 16, and a lower side of the drainage plate 14 is provided with a second blowing mechanism 17.

The inclined setting refers to providing the drainage plate at a certain inclination angle so as to utilize gravity to make the condensate water flow naturally downward, thereby realizing effective drainage. The inclination angle refers to an angle between the drainage plate 14 and a horizontal plane. The inclination angle of the drainage plate may be preset according to actual needs. For example, the inclination angle of the drainage plate ranges from 2° to 8°. As another example, the inclination angle of the drainage plate ranges from 2° to 5°. As another example, the inclination angle of the drainage plate ranges from 5° to 8°. As a further example, the inclination angle of the drainage plate ranges from 1° to 9°.

In some embodiments, the inclination angle of the drainage plate 14 is 5°. In some embodiments, the inclination angle of the drainage plate is 6°.

In some embodiments of the present disclosure, the inclination angle of the drainage plate is set to facilitate the flow of the condense water to the lower end after the water vapor condenses at the drainage plate 14 and collection in the drainage chamber 6.

The lower end of the drainage plate refers to an end of the drainage plate that is positioned relatively low, which is usually the position where the liquid flows out or is discharged. The higher end of the drainage plate refers to an end of the drainage plate that is positioned relatively high, which is usually the position where the liquid enters or starts. The lower side of the drainage plate 14 refers to a side of the drainage plate below the drainage plate near the bottom plate of the box body 1.

A count of the support plate 15 and a count of the second support block 16 may be preset according to actual needs.

Similar to the first blowing mechanism 11, the second blowing mechanism refers to a component that introduces outside air into the thermostatic box, such as a fan provided with a power control device system. A plurality of second blowing mechanisms 17 may be provided. A count of the second blowing mechanisms 17 may be set according to actual needs.

In some embodiments, the second blowing mechanisms 17 may be provided in various ways. For example, the second blowing mechanisms 17 may be provided using the same setting as the first blowing mechanisms. As another example, through holes for mounting the second blowing mechanisms 17 are provided on the bottom plate of the box body 1. The through holes refer to through holes cut into the bottom plate of the box body for mounting or connecting the second blowing mechanisms 17. For example, as shown in FIG. 4, two large circular holes in the bottom plate of the box body 1 are mounting positions for the second blowing mechanisms 17, and small holes around the large circular holes are the through holes for mounting the second blowing mechanisms 17. It should be noted that the mounting holes for the second blowing mechanisms 17 are aligned with the through holes on the bottom plate of the box body 1. A count of the through holes is positively correlated with the count of the second blowing mechanisms 17.

Cold air inside a refrigerator is blown into a second ventilation chamber 19 through the second blowing mechanisms 17, and then the cold air enters the first ventilation chamber 12 through the second ventilation chamber 19. The first blowing mechanisms 11, the second blowing mechanisms 17, and the air outlet holes 4 are cooperated, which facilitates the cold air inside the refrigerator to enter into the thermostatic box, and promotes the circulation of the air inside the thermostatic box, so that the temperature inside the thermostatic box is uniform.

More descriptions regarding the second ventilation chamber 19 may be found in the present disclosure below.

In some embodiments, the first ventilation chamber 12 is formed between the fan support bracket 10 and the side wall of the box body 1, the second ventilation chamber 19 is formed between the drainage plate 14 and the bottom plate of the box body 1, the first ventilation chamber 12 being communicated with the second ventilation chamber 19.

The first ventilation chamber 12 and the second ventilation chamber 19 are chambers in the box body for directing air flow. As shown in FIG. 3, the first ventilation chamber 12 is located on the right side of the box body and the second ventilation chamber 19 is located on the lower side of the box body.

In some embodiments, the first ventilation chamber 12 being communicated with the second ventilation chamber 19 means that a plurality of second support blocks 16 are spliced together in a front-back direction to support the higher end of the drainage plate 14, and gaps present in the splicing allow the first ventilation chamber 12 to be communicated with the second ventilation chamber 19.

In some embodiments, the first ventilation chamber 12 being communicated with the second ventilation chamber 19 means that the first ventilation chamber 12 and the second ventilation chamber 19 are connected in a preset manner by the second support block 16, such that air or gas may flow between the first ventilation chamber 12 and the second ventilation chamber 19. The preset manner includes providing a channel, providing an opening, or the like, on the second support block 16. The preset manner may be set by staff based on experience.

In some embodiments, a specific process of using the thermostatic box for preparing the hydrogel by the freeze-thaw process provided in the present disclosure includes: firstly, opening the front cover plate 3, placing a mold containing the samples on the porous storage platforms 7, then installing the front cover plate 3, placing the thermostatic box into the refrigerator, and turning on the first blowing mechanism 11 and the second blowing mechanism 17 to circulate air in the thermostatic box for cooling the samples. After cooling is completed based on a set time, open the front cover plate 3 to remove the mold, and the process is finished.

In some embodiments of the present disclosure, the thermostatic box for preparing the hydrogel by the freeze-thaw process is provided. The thermostatic box is set to a small volume, allowing the thermostatic box to be placed inside the refrigerator. In addition, the air blowing mechanisms are disposed inside the thermostatic box to facilitate air circulation, ensuring uniform temperature distribution inside the thermostatic box. The drainage chamber is disposed at the bottom of the thermostatic box to collect the water vapor entering from the refrigerator, facilitating centralized processing of the collected water vapor. The hydrogels prepared using the thermostatic box provided in the present disclosure exhibit consistent mechanical properties, which enhances the stability of the hydrogels and facilitates experiments using the hydrogels.

Example 2

The present disclosure provides a preparation method of a thermostatic box for preparing a hydrogel by a freeze-thaw process. The preparation method may be applied to the thermostatic box for preparing the hydrogel by the freeze-thaw process. The preparation method includes: S1, establishing a component model of a box body using SOLIDWORKS, adjusting dimensions of a plurality of components and dimensions and positions of holes, and assembling the plurality of components into a box body model; S2, cutting acrylic plates based on the dimensions of the plurality of components; S3, fixedly connecting a first blowing mechanism and a second blowing mechanism to corresponding acrylic plates by bolts; and S4, bonding the plurality of components completely using a bonding agent based on the box body model. S1, establishing a component model of a box body using SOLIDWORKS, adjusting dimensions of a plurality of components and dimensions and positions of holes, and assembling the plurality of components into a box body model.

The SOLIDWORKS is a three-dimensional computer-aided design (3D CAD) software.

The component model refers to a 3D geometric model of each of independent parts in the design of the box body. The independent parts, also referred to as the components, include the box body, a front cover plate, an upper cover plate, porous storage platforms, etc. More descriptions may be found in the related descriptions of FIGS. 1-4.

The holes include air outlet holes, a drainage hole, through holes, etc. More descriptions may be found in the related descriptions of FIGS. 1-4.

The box body model refers to a complete 3D model formed by assembling a plurality of component models together according to a design intent.

In some embodiments, the S1 specifically includes: determining functions, dimensions, and materials of the plurality of components of the thermostatic box; creating the plurality of component models of the thermostatic box using tools such as stretching and rotating in SOLIDWORKS; adding features such as holes, chamfers, rounded corners, or the like, to accurately reflect an actual structure of the thermostatic box; assembling the plurality of component models of the thermostatic box into a complete box body model; checking interference and fit relationships between the components for adjustment.

S2, cutting acrylic plates based on the dimensions of the plurality of components.

The acrylic plates may include a plurality of thicknesses. In some embodiments, a thickness of one of the acrylic plates is 5 mm. In some embodiments, the thickness of one of the acrylic plates is 6 mm. The thicknesses of the acrylic plates may be set according to actual needs. In some embodiments, the plurality of components may be made of other materials in addition to the acrylic plates, such as a PC plate, a PS plate, or the like. The materials used for manufacturing the plurality of components may be set according to actual needs.

S3, fixedly connecting a first blowing mechanism and a second blowing mechanism to corresponding acrylic plates by bolts.

The first blowing mechanism and the second blowing mechanism may be fixedly connected to the corresponding acrylic plates in various ways. For example, first blowing mechanism and the second blowing mechanism may be fixedly connected to the corresponding acrylic plates by the bolts. As another example, the first blowing mechanism and the second blowing mechanism may be fixedly connected to the corresponding acrylic plates by bonding with a bonding agent. The fixed connection of the first blowing mechanism and the second blowing mechanism may be set according to actual needs.

In some embodiments, the first blowing mechanism is disposed in a fan support bracket; the second blowing mechanism is disposed on a lower side of a drainage plate. More descriptions may be found in the related descriptions of FIGS. 1-4.

S4, bonding the plurality of components completely using a bonding agent based on the box body model.

In some embodiments, the plurality of components may be assembled to form a complete structural assembly based on the box body model in various ways. For example, the plurality of components are bonded using the bonding agent as described. As another example, the plurality of components are assembled using mechanical connection. An assembly manner of the plurality of components may be set according to actual needs.

The bonding agent refers to an acrylic-specific bonding agent. More descriptions regarding the acrylic-specific bonding agent may be found in the corresponding descriptions of FIGS. 1-4.

In some embodiments of the present disclosure, by constructing the 3D model of the thermostatic box using SOLIDWORKS, the plurality of components of the thermostatic box can be accurately designed, and the dimensions, shapes, and structures of the thermostatic box can be quickly adjusted to meet different needs. The use of the acrylic plates can fully utilize the transparency of the acrylic plates, which makes it easy to observe the state of the samples or equipment inside the thermostatic box without opening the door of the box; meanwhile, the acrylic plates have a relatively low density, making it convenient for transportation and mounting.

When describing the operations performed in the embodiments of the present disclosure in terms of the steps, the order of the steps are all interchangeable, the steps may be omitted, and other steps may be included in the process of the operation, if not otherwise specified.

The embodiments in the present disclosure are for the purpose of exemplification and illustration only and do not limit the scope of application of the present disclosure. For a person skilled in the art, various corrections and changes that can be made under the guidance of the present disclosure are still within the scope of the present disclosure.

Some features, structures, or characteristics of one or more embodiments of the present disclosure may be suitably combined.

In some embodiments, numbers describing the number of ingredients and attributes are used. It should be understood that such numbers used for the description of the embodiments use the modifier "about," "approximately," or "substantially" in some examples. Unless otherwise stated, "about," "approximately," or "substantially" indicates that the number is allowed to vary by ±20%.

Correspondingly, in some embodiments, the numerical parameters used in the description and claims are approximate values, and the approximate values may be changed according to the required features of individual embodiments. Although the numerical ranges and parameters used to confirm the breadth of the range in some embodiments of the present disclosure are approximate values, in specific embodiments, settings of such numerical values are as accurate as possible within a feasible range.

In the event of any inconsistency or conflict between the descriptions, definitions, and/or the use of terms in the materials cited in the present disclosure and what is stated in the present disclosure, the descriptions, definitions, and/or the use of terms in the present disclosure shall prevail.

What is claimed is:

1. A thermostatic box for preparing a hydrogel by a freeze-thaw process, comprising a box body, wherein a top of the box body is provided with an upper cover plate, and a front side of the box body is provided with a front cover plate, wherein
a plurality of uniformly distributed air outlet holes are disposed in the upper cover plate, a storage chamber and a drainage chamber are disposed in the box body, the storage chamber is located on an upper side of the drainage chamber, a plurality of porous storage platforms arranged in parallel are disposed in the storage chamber, a side of the plurality of porous storage platforms is provided with a first blowing mechanism, an area located on a right side of the drainage chamber and a lower side of the plurality of porous storage platforms is provided with a second blowing mechanism, and a side of the drainage chamber is provided with a drainage hole.

2. The thermostatic box of claim 1, wherein a main body of the box body is made of acrylic plates by splicing, and adjacent acrylic plates of the acrylic plates are connected by a bonding agent.

3. The thermostatic box of claim 1, wherein a side of one of two adjacent porous storage platforms and a side of the other of the two adjacent porous storage platforms are connected by a first support block, and another side of one of the two adjacent porous storage platforms and another side of the other of the two adjacent porous storage platforms are connected by a fan support bracket, the first blowing mechanism being disposed in the fan support bracket.

4. The thermostatic box of claim 1, wherein a top of the drainage chamber is provided with a plurality of first support rods for supporting the plurality of porous storage platforms, and two ends of each of the plurality of first support rods are respectively connected with a front side wall and a rear side wall of the box body by fixing pins.

5. The thermostatic box of claim 3, wherein the drainage chamber is provided with an inclined drainage plate located on a lower side of the storage chamber, a lower end of the drainage plate is connected to a bottom plate of the box body by a support plate, a higher end of the drainage plate is connected to the bottom plate of the box body by a second support block, and a lower side of the drainage plate is provided with the second blowing mechanism.

6. The thermostatic box of claim 5, wherein an inclination angle of the drainage plate is 5°.

7. The thermostatic box of claim 5, wherein a first ventilation chamber is formed between the fan support bracket and a side wall of the box body, a second ventilation chamber is formed between the drainage plate and the bottom plate of the box body, and the first ventilation chamber is communicated with the second ventilation chamber.

8. A preparation method of a thermostatic box for preparing a hydrogel by a freeze-thaw process, wherein the preparation method is applied to the thermostatic box for preparing the hydrogel by the freeze-thaw process of claim 1, the preparation method comprises:

S1, establishing a component model of a box body using SOLIDWORKS, adjusting dimensions of a plurality of components and dimensions and positions of holes, and assembling the plurality of components into a box body model;

S2, cutting acrylic plates based on the dimensions of the plurality of components;

S3, fixedly connecting a first blowing mechanism and a second blowing mechanism to corresponding acrylic plates by bolts; and S4, bonding the plurality of components completely using a bonding agent based on the box body model.

* * * * *